D. LOVE.
TRAIN SPEED COMPUTER AND INDICATOR.
APPLICATION FILED FEB. 3, 1910.
1,014,832.
Patented Jan. 16, 1912.
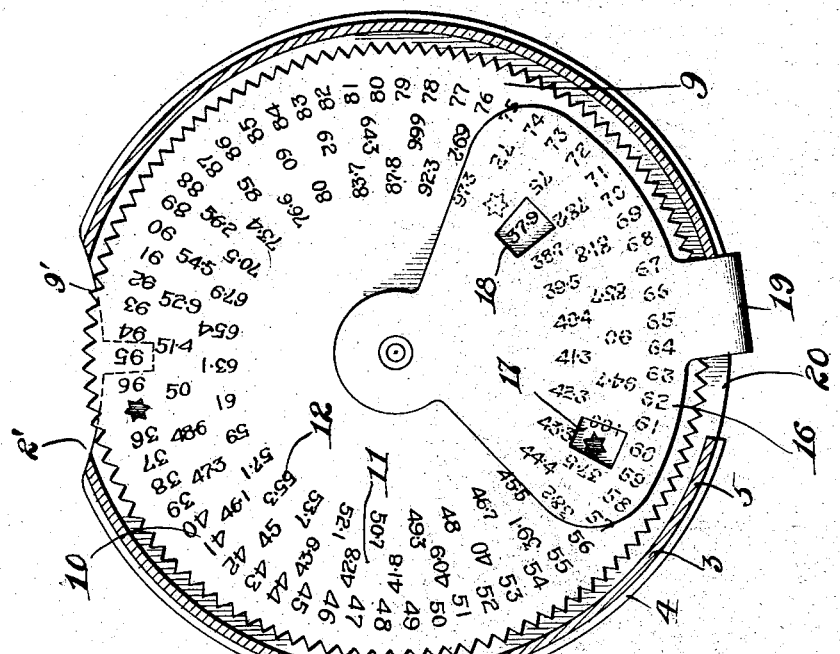
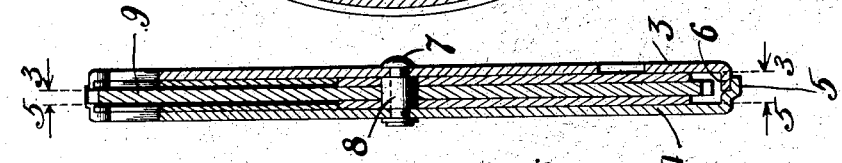
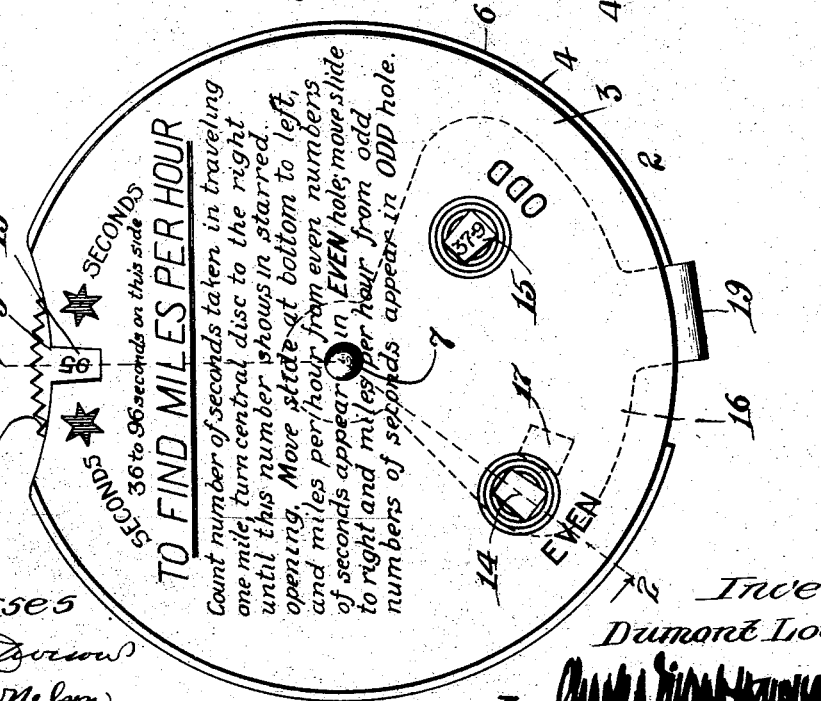

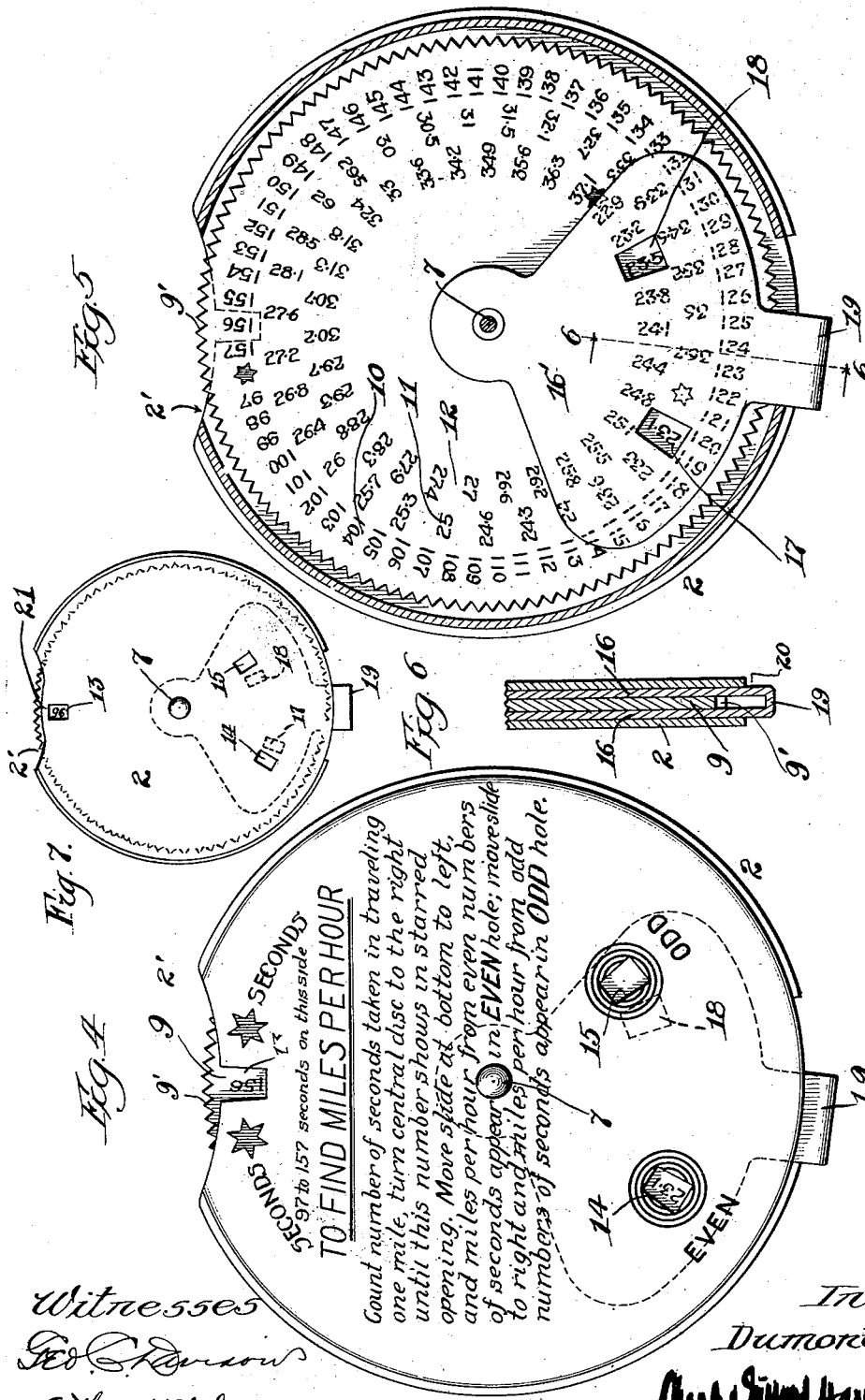

UNITED STATES PATENT OFFICE.

DUMONT LOVE, OF CHICAGO, ILLINOIS.

TRAIN-SPEED COMPUTER AND INDICATOR.

1,014,832.  Specification of Letters Patent.  Patented Jan. 16, 1912.

Application filed February 3, 1910. Serial No. 541,944.

*To all whom it may concern:*

Be it known that I, DUMONT LOVE, a citizen of the United States, and resident of the city of Chicago, county of Cook, and State of Illinois, have invented certain new and useful Improvements in Train-Speed Computers and Indicators, of which the following is a full, true, and exact description, such as will enable others skilled in the art to which it appertains to carry out, make, and use the same.

My invention relates to direct reading indicators and has special reference to an indicator designed to exhibit a result of a definite calculation in relation to a given component factor.

The principal object of the invention is to provide an easy means of quickly ascertaining the result of a definite calculation when a given component factor is known.

Further, my object is to provide a direct reading indicator which is arranged to indicate the miles per hour at which a train is running when the number of seconds which it requires in which to run one mile is known.

My invention consists broadly in a direct reading indicator, provided with a series of numbers representing one component factor of a computed result and other series of numbers representing corresponding computed results bearing a definite calculated relation to the first series and means whereby when a number in the component series of numbers is exposed to view the corresponding number in the resultant series may be read, being so arranged that when a predetermined number in the component series is exposed to view at one given point the corresponding calculated resultant will be exposed to view at another given point.

Further, the preferred form of my invention consists in a direct reading indicator comprising a casing having sight openings therein, an indicator dial rotatable within said casing bearing on its face a series of numbers representing one component factor of a computed result, a second series of numbers representing corresponding computed results bearing a definite relation to the numbers of the first series, said openings and rows of numbers being so arranged on said dial that when a number in the component series is exposed to view at one of said openings the corresponding computed result will be exposed at another of said openings.

Further, and more specifically, the invention consists in a direct reading indicator comprising a casing, a rotatable indicator dial within said casing, said dial bearing on its face a series of numbers representing component factors of computed results, and two rows of numbers representing computed results, the numbers in each row thereof having corresponding numbers in the component series, a sight opening in the casing for each row of numbers, the several openings and series of numbers being so related that when certain of the numbers in the component series are exposed to view the corresponding computed result in one of the other rows will be exposed to view at the opening corresponding to said row and when certain other numbers in the component series are exposed to view the corresponding computed result in the other row will be exposed to view at the opening of that row and a shutter adapted to cover one or the other of said openings.

Further, and more particularly, my invention consists in features of construction and in combinations of parts all as hereinafter fully described and all pointed out in the claims.

Reference to the accompanying drawings forming a part of this specification, will lead to a clear understanding of the invention. In said drawings I have illustrated one of many embodiments of my invention.

Figure 1 of the drawings is a face-view of an indicator embodying my invention; Fig. 2 is a transverse sectional view shown on the irregular line 2—2 of Fig. 1; Fig. 3 is a vertical sectional view on the line 3—3 of Fig. 2 showing the obverse side of the index plate illustrated in Fig. 1; Fig. 4 is a face-view of the reverse side of the indicator; Fig. 5 is a sectional view, similar to that shown in Fig. 3, but showing the reverse face of the dial. Fig. 6 is a fragmentary sectional view on the line 6—6 of Fig. 5 to clearly show the movable slide; Fig. 7 is a view in elevation of one face of an indicator illustrating some slight modifications of details.

In said drawings, 2 is a casing made up of the two flanged dish-like members or plates, 3 and 4, having their circumferential edges, 5 and 6, respectively, flanged or turned inwardly and arranged to fit snugly, telescopically together. Said plates 3 and 4 are held together to form the case 2, by the rivet or stud 7, centrally located and carrying the spacing thimble or tube, 8, to space the plates definitely apart and form a bearing or pivot for the movable members mounted thereon within said casing. An indicator dial, 9, is mounted on said pivot 7, within said case, and, as both faces of the device are similar, the detail description will refer to one side only. Said disk is provided with three concentric series of figures. The outer series, 10, begins at 36 and reads by steps of a whole unit consecutively to and including 96 and indicates, in the illustrated embodiment of my invention, the number of seconds consumed by a train to travel or pass one mile. Between the ends, and occupying one space in the series, is a star character. The second and third series, 11 and 12, respectively, represent the number of miles per hour which an object will travel if it requires any one of the number of seconds shown in series, 10, to travel one mile, the outer series of the two, or series 11, being the number of miles corresponding with the even seconds and the inner of the two, or series 12, being the number of miles corresponding with the odd seconds. The figures of the resultant series are arranged in two rows which permits them to be large enough to be easily read.

The plate 3 of the case is provided with three sight openings, 13, 14 and 15, through which the numbers of the series, 10, 11 and 12, respectively, may be read. Said opening 13 is adjacent the upper edge or top of the case and the outer two are placed at either side and near the bottom for reasons explained hereinafter.

As shown in Fig. 1, the opening, 14, is marked "Even" and the opening 15 is marked "Odd" and the plate has printed upon its face the following: "To find miles per hour count number of seconds taken in traveling one mile, turn central disk to the right until number shows in starred opening. Move slide at bottom to left, and miles per hour from even numbers of seconds appear in "Even" hole; move slide to right and miles per hour from odd numbers of seconds appear in "Odd" hole.

The index disk, 9, has a milled or serrated outer edge, 9′, and the case, 2, is cut away at its upper portion forming the notch 2′ to expose said milled edge to permit of the easy rotation of the disk in an obvious manner. The outer series of numbers, 10, is arranged contrary clock-wise so that to bring the numbers in same to view through the opening, 13, in an increasing ratio it is necessary to move the upper edge of the disk to the right or as one would naturally move it with the finger when holding the case in the hand. The numbers of the series 11 and 12 are so placed in relation to the numbers in row 10 that when an even number of seconds is exposed through the opening 13 the number of miles indicated by same in row 11 is exposed through opening 14, and when an odd number of seconds appears in opening 13 the corresponding number of miles can be seen on series 12 through opening 15.

To prevent confusion and make it possible to read none but the correct answer, a movable slide, 16, fan-shaped in side elevation, is pivotally mounted on said centerpin, 7, within said case between the index plate, 9, and the case, 2, and is provided with openings, 17 and 18, arranged to register with the openings 14 and 15 respectively, when at opposite limits of its movement. A handle or thumb-piece, 19, integral with said slide, 16, projects through a suitable slot or opening, 20, in the lower side wall of said case, 2, 2 the flanges of same being cut away and the end walls of said slot forming stops to engage the edges of said thumb-piece, 19, to limit its movement. The said openings 17 and 18 in said slide are spaced closer together than the openings 14 and 15 in the case, 2, and consequently when the slide is moved to one limit of its movement, to cause one of its openings to register with the corresponding opening of the case, the other opening of the slide will lie at one side of its corresponding opening in the case and the number immediately under said opening will be covered. Said slide is U-shaped, as indicated in Fig. 6, and embraces said index disk, 6, one side being practically a duplicate of the other and arranged to operate similarly. The reverse side of the said indicator, opposite to the side hereinbefore described, as illustrated in Figs. 4 and 5, is exactly similar to the reverse side shown in Figs. 1 and 3, except that the seconds per mile are continued in an ascending series or from 97 to 157, inclusive, and the numbers in the corresponding inner series are increasingly larger in like proportion. Thus the instrument, as illustrated, indicates the miles per hour for a variation of running time from 36 seconds to one mile to 157 seconds for the same distance. For instance, as shown in Fig. 1, if 95 seconds are consumed in traveling one mile the speed or mile per hour may be indicated by the appearance of the figures 37.9 in the "Odd" opening. It will be understood that the series of numbers may be varied in any desired manner to suit the purpose for which the indicator is to be used without departing from the spirit of the invention. Each of the inner series of figures are provided with a star in the space between the ends of the series of numbers and when the star in the first or outer row of numbers appears in opening, 13, a star will also appear in each of the openings 14 and 15 when exposed by the slide 16.

In Fig. 7 some slight modifications are illustrated. In Figs. 1 to 5 the notch 2′ of the case 2 is shown as cutting into the opening 13. In Fig. 7 a slight guard or bar, 21, is left between said notch 2' and opening 13 to give a more finished appearance.

It is desirable when the movable slide, 16, is in its central position or midway between its stops, that both of the springs 15 and 16 shall be closed by same to prevent the entering of dust. This is clearly indicated in Fig. 7 in which the slide, 16, is shown in its central position and its openings, 17 and 18, are shown in dotted lines and are seen to be located toward the center from said openings, 15 and 16, of the case, registering with neither of them in this position.

In use, the operation of my invention is very simple. The indicator disk is prepared to indicate the computed results corresponding to a series of component factors, for instance, such as the number of miles a train will run in an hour when the number of seconds which it occupies in going one mile is known.

To use the device to find the number of miles per hour at which a train is traveling, the number of seconds which it consumes in passing one mile being known, the indicator dial is rotated until this number appears in opening 13, then if the number of seconds is even, the slide, 16, is moved to the left and the result or number of miles per hour appears in opening 14. Should the number of seconds per mile be odd, the slide is moved to the right and the result or miles per hour appears at opening 15.

Having thus fully described my invention, what I claim and desire to secure by Letters Patent is:

1. In a direct reading indicator, the combination with a casing, of an indicator dial rotatable within said casing having a series of numbers arranged in a circle adjacent to its edge, and two rows of numbers arranged in smaller concentric circles, said larger circle of numbers representing one component factor of a computed result, the numbers in one of said smaller circles representing computed results corresponding with certain of the numbers in said larger row and the numbers in the other smaller circle representing computed results corresponding with certain other numbers in the larger row, sight openings in said casing corresponding with each of said rows of numbers through which single numbers of each row may be viewed, and a movable shutter within said casing having a limited movement and controlling the sight openings through which the numbers of said smaller circles can be viewed, and adapted, when placed in its limiting positions, to open one of said sight openings and close the other, substantially as described.

2. In a direct reading indicator, the combination with a casing, of an indicator dial rotatable within said casing having a series of numbers arranged in a circle adjacent to its edge, and two rows of numbers arranged in smaller concentric circles, said larger circle of numbers representing one component factor of a computed result, the numbers in one of said smaller circles representing computed results corresponding with certain of the numbers in said larger row and the numbers in the other smaller circle representing computed results corresponding with certain other numbers in the larger row, said casing having sight openings corresponding with each of said rows of numbers through which single numbers of each row may be viewed, and a movable shutter within the casing having two openings adapted respectively to register with the two sight openings through which the numbers in the smaller circles can be viewed, said openings through the shutter being spaced to prevent both thereof registering with their opposed openings at the same time, substantially as described.

3. In a direct reading indicator, the combination with a casing, of an indicator dial rotatably mounted within same and bearing on its face a series of consecutive numbers arranged in a circle adjacent to its edge and representing component factors of computed results, and a series of computed results corresponding with said component factors and arranged in two smaller circles concentric with the circle of component factors, the numbers in one of said smaller circles representing computed results related to even numbers in the circle of component factors, and the numbers in the other of said smaller circles representing computed results corresponding with the odd numbers in the circle of component factors, said casing being provided with sight openings through which one of the numbers in each of said circles can be viewed at a time, and a shutter within said casing having a limited movement and adapted at one of its limits to uncover the sight opening through which the numbers of one of said smaller circles can be viewed and at the same time to close the opening through which the numbers of the other smaller circle can be viewed and vice versa, substantially as described.

4. In a direct reading indicator the combination with a casing, of an indicator dial rotatably mounted within same and bearing on its face three concentric rows of numbers, the outer row comprising consecutive numbers representing component factors of computed results, and one of the inner concentric rows of numbers representing computed results corresponding with the even numbers in said outer row, and the other of said inner rows representing computed results corresponding with the odd numbers in said outer row, said casing being provided with sight openings corresponding with each of said concentric rows of numbers, a shutter mounted within said casing and having a limited movement and adapted at one limit of its movement to close the sight opening corresponding with one of said inner rows of numbers and open the sight opening corresponding with the other of said inner rows of numbers, and vice versa, and means on said casing indicating which of the sight openings the shutter should uncover to expose to view the computed result corresponding with any specific number in the circle of component factors, substantially as described.

5. In a direct reading indicator having its obverse and reverse sides similarly formed, the combination with a casing, of an indicator dial rotatably mounted within same bearing on each face a series of consecutive numbers representing component factors of computed results arranged thereon in a circle adjacent to its edge and two smaller concentric circles of numbers representing computed results, the numbers in one of said smaller rows corresponding with the even numbers of said outer row and the numbers in said other smaller circle corresponding with the odd numbers in said outer row, said casing having sight openings in each side for each row of numbers, a shutter in said casing having a limited movement and controlling the sight openings through which the numbers of the smaller circles on each side of the dial can be viewed, and adapted at one limit of its movement to close one of said sight openings on each side of the indicator, and at the other limit of its movement to close the opposite opening on each side of the indicator, and means on said casing indicating which of the sight openings should be uncovered to correspond with any specific number exposed in the sight opening of the component factors, substantially as described.

6. In a direct reading indicator having its obverse and reverse sides similarly formed, and comprising a disk-like hollow casing, in combination with a center pivot, a disk journaled on said pivot for rotation in said casing, said disk bearing on each face a series of consecutive numbers representing component factors of computed results and arranged in a circle adjacent to its edge, and a series of numbers representing computed results arranged in two smaller concentric circles, the numbers in one of said smaller circles corresponding with the even numbers in said larger circle and the numbers in the other of said smaller circles corresponding with the odd numbers in said larger circle, said casing having sight openings in each side through which a single number of each of the concentric rows of numbers can be viewed, a shutter within the casing movably mounted upon said pivot and controlling the openings in each side of the casing corresponding with the smaller circles of numbers, said casing having a slot in its edge and said shutter having a thumb piece projecting through said slot by which it can be moved, the thumb piece and the ends of the slot coöperating to limit the movement of said shutter, and said shutter being adapted at one limit of its movement to uncover one of the openings in said casing in each side corresponding with one of the smaller circles of numbers and at the other limit of its movement to uncover the opening in each face of the casing corresponding with the other smaller circle of numbers, substantially as described.

In testimony whereof, I have hereunto set my hand, this 29th day of January, 1910, in the presence of two subscribing witnesses.

DUMONT LOVE.

Witnesses:
 EDWARD T. WILSON,
 JOHN R. LEFEVRE.